July 20, 1926.

J. W. CAUSEY

ADJUSTABLE GUIDE FOR BAND SAWS

Filed Nov. 6, 1924

Inventor
Joseph W. Causey
By William W. Deane
his Attorney

July 20, 1926.  
J. W. CAUSEY  
ADJUSTABLE GUIDE FOR BAND SAWS  
Filed Nov. 6, 1924    2 Sheets-Sheet 2
1,593,436
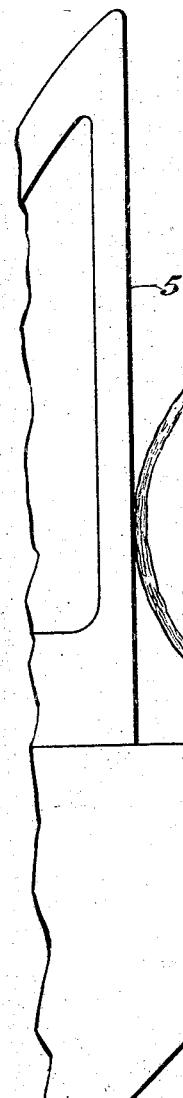
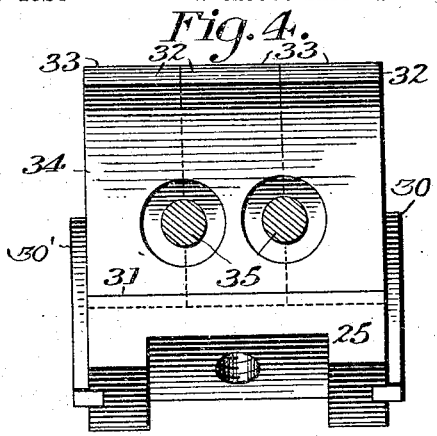
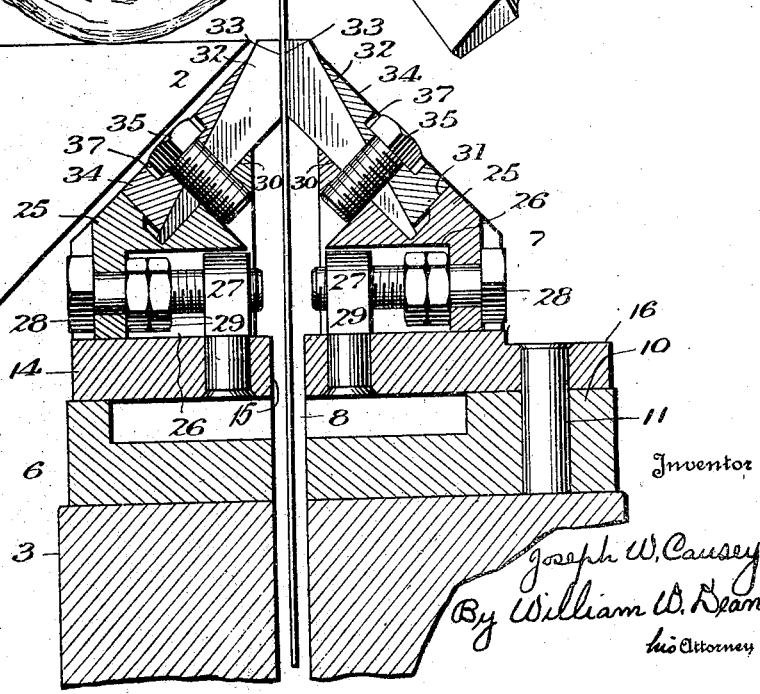

Patented July 20, 1926.

1,593,436

UNITED STATES PATENT OFFICE.

JOSEPH W. CAUSEY, OF ELECTRIC MILLS, MISSISSIPPI.

ADJUSTABLE GUIDE FOR BAND-SAWS.

Application filed November 6, 1924. Serial No. 748,109.

My invention relates to improvements in saw guides for use in band saw mills.

On the 29th day of July, 1919, there was issued to me Patent No. 1,311,593, for an adjustable guide for band saws to which attention is directed in connection with the present invention.

My present invention is designed as an improvement over the device disclosed in said patent, the primary purpose of the invention being to provide a saw guide that may be more advantageously adjusted and situated, relative to the work than the guide of my former patent, particularly when the invention is used in mills utilizing a certain type of equipment.

In addition to the above, my invention comprehends a saw guide for band saws, particularly adapted for use with band saws of the type having double cutting edges, and constructed to prevent work from damaging the edges of the saw in the event that said work should escape from its carriage or become shifted out of its proper position relative to the saw.

The nature of my improvements, together with other advantages and objects arising by virtue thereof, will be clearly understood when the following description and claims are read with reference to the drawings accompanying and forming a part of this specification.

In the drawings:—

Fig. 3 is a transverse section on the line 3—3 of Fig. 2, drawn on an enlarged scale with reference to Figs. 1 and 2, and illustrating the position of the guide relative to a certain type of log or work carriage, Fig. 4 is a side elevation of one set of the clamp and guide blocks forming a part of the device, and Fig. 5 is a perspective view of one of the guide blocks.

Figure 1:
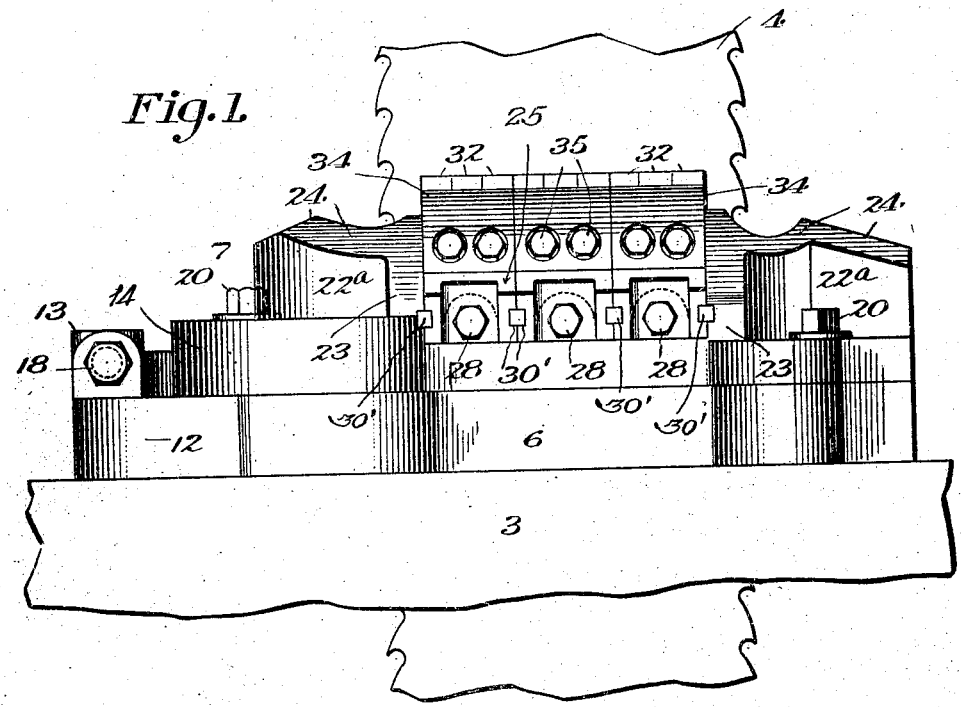
Fig. 1 is a side elevational view of my improved band saw guide.

Before describing my invention in detail, it may be stated that in certain standard types of log carriages for band saw mills, the base of the head block is inclined, at its front edge, upwardly and forwardly toward the band saw to provide a nose projecting over the base of the mill and close to the saw. This arrangement has been illustrated generally in Fig. 3 in which the numeral 1 designates the base of the head block, 2 the inclined or projecting nose thereof, and 3 the base of the mill, through which the band saw 4 travels and upon which the saw guide is usually mounted. It will, of course, be understood that the purpose of the above described mill features is to provide for setting the knee 5 close to the saw 4. Heretofore, with mill equipment of this character, the use of laterally adjustable guiding devices upon each side of the saw has been prevented from assuming proper height relative to the head of the base block 1 by the inclination of the nose 2 in its overhanging position relative to the mill base, and the fact that the height of the base of the head block 1 from the base 3 varies in different makes of equipment. To accurately guide the saw, the guide medium should be substantially level with the top of the nose 2.

My novel saw guide may be described as comprising two units, a supporting or base plate 6 suitably affixed in a horizontal position on the mill base or foundation 3, and a saw guide unit supported upon the plate 6. The base plate 6 is elongated in outline and bifurcated to form a vertical recess 8 along its horizontal center in which the saw travels. Adjacent the cutting edges of the saw the recess 8 is enlarged as shown at 9 in Fig. 2 to permit saw dust to freely escape downwardly through the plate. Upon one side of the plate 6 and about midway of its ends, a laterally projecting lug 10 is provided for receiving a vertical pivot pin 11, the function of which will presently appear. At one end of the plate 6, and at one side of its longitudinal center, a lug 12 is formed in which an upstanding eye bolt 13 is pivoted and internally threaded.

Figure 2:
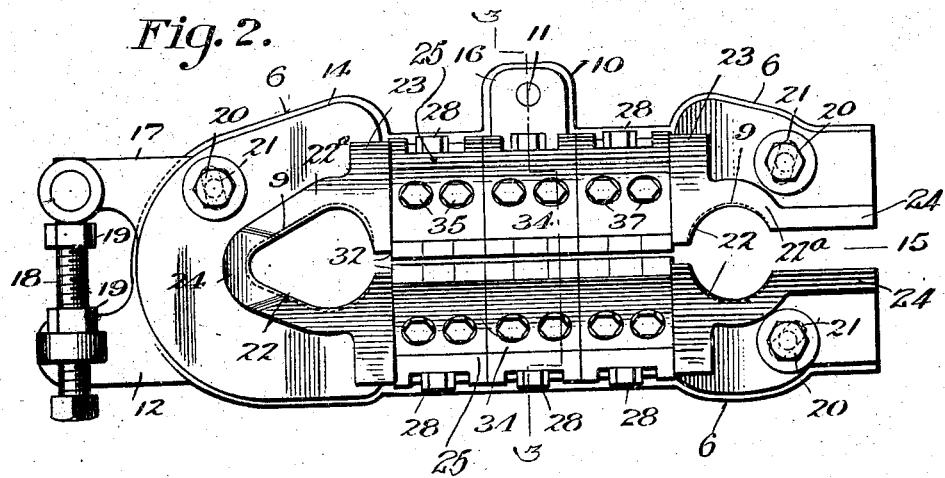
Fig. 2 is a top plan view thereof.

Bearing upon the base plate 6 is a top plate 14 similar in outline to the base plate 6 and also bifurcated to provide a vertical recess 15 arranged to register with the recess 8 when the top plate is mounted upon the base plate 6 as shown in Figs. 2 and 3. Intermediate its ends, the top plate 14 is provided with a laterally projecting lug 16 which receives the before mentioned pin 11 by means of which the top plate is arranged to swing upon the base 6 in a plane transversely to the saw. At one of its ends the top plate 14 is provided with a longitudinally extending lug 17 corresponding to the lug 12, and upon the opposite side of the longitudinal center of the base plate 6. A threaded bolt 18 is pivoted at one end upon the lug 17 with the other end projecting through the eye bolt 13. Nuts 19 are mounted upon the bolt 18 and operate to secure any desired degree of lateral adjustment of the top plate. If required, the plate 14 may be bored to receive clamp bolts 20 and the base 6 provided with arcuate slots indicated by dotted lines 21, to enable the top plate 14 to be firmly clamped in adjusted position. Recesses 15 are formed in the top plate 6 in vertical alinement with the recesses 8 in the base plate, and enlarged laterally in alinement with the enlargement 9 in the base plate, to permit the saw dust to freely pass. Attached in any suitable manner to the upper face of the top plate are spaced stop members 22ª with passages registering with the saw passages 8 and 15, and enlarged laterally to register with the saw dust cavities 9 and 22.

The confronting faces of the portions 23 are vertical and extend transversely of the members 6 and 14, as shown, so that should a log or timber escape the head block base 1 as said log is moved thereon toward either edge of the saw 4, it will be deflected from engagement with the saw teeth to prevent damage to the saw, and also to prevent the end of a log from jamming against the guards.

Between the guide portions 23 there are slidably mounted a plurality of guide block holders 25 arranged in pairs with the holders of each pair disposed opposite each other and upon opposite sides of the saw. These holders 25 are adapted for individual adjustment upon the plate 14 laterally of the saw. Each holder 25 is chambered as at 26 to engage over one of a series of internally threaded eye bolts 27 arising from the plate 14 and supports a headed bolt 28 threaded through its base with one end engaging the threads of the eye bolt 27. Nuts 29 are arranged upon the bolts 28 so that as they are screwed into the eye bolts, or reversely, the supports 25 will be moved upon the base 14 laterally of the saw 4. If desired the holders 25 may be guided by horizontal keys 30¹ arranged between adjoining supports and between the end supports and the guide flanges 23.

The outer portions of the holders 25 are inclined upwardly and toward the saw 4, the degree of inclination being the same as that of the nose 2 of the base of the head block 1.

The upper confronting faces of the guide blocks 32 are parallel with each other for a distance as shown in Fig. 3, to provide saw engaging faces 33. Each of the block holders 25 is formed with outwardly opening seats 30 each with a reversely inclined bottom and with a stop shoulder 31 at the bottom of each seat, the shoulders being directed at right angles to the inclined bottoms of the seats. The holders are indicated at 32, preferably of hard wood and arranged side by side and filling the space between the guide portions 23, as shown in Figs. 1, 2 and 4.

Each of the holders converge toward the lower end and bearing by the smaller end respectively against the stop shoulder. A clamp member 34 bears upon the outer inclined face of each member 32 and converges toward the outer upper end and bearing by the larger end against the stop shoulder 31 externally of the thinner end of the holder.

Each of the blocks 25 is formed with a threaded aperture to receive a clamp bolt 35, and each of the wood blocks 32 and the clamp members 34 is also apertured to receive the clamp bolt, the head of each bolt being received in a counterbore 37 at the outer end of the aperture of the clamp member 34, as shown, so that the heads of the clamp bolts do not extend appreciably beyond the outer faces of the holders and the clamp members.

It will be seen that the foregoing construction for holders and clamping plates present an upper or side face oppositely angled upon each side of the saw 4, which is to say, on each side of the longitudinal center of the guide elements to coincide with the angle of the front end of the head block base 1. By virtue of this construction the guide elements may be positioned close to the head block base 1, at the required height to rigidly maintain the guide blocks 32 in position to guide the saw immediately below the level of the head block base 1, and still permit lateral adjustment of the guide blocks 32 to adjust the saw throughout different vertical zones thereof. Furthermore, the guide elements may be swung about the pin 11 to adjust the cutting edges of the saw 4 in the proper plane.

The foregoing constitutes a detailed description of a preferred form of my invention, but it is to be understood that the present disclosure is illustrative in character and that changes and modification may be resorted to within the scope of the appended claims.

What I claim is:—

1. A band saw guide, comprising an adjustable base member having a passage for the saw, guide block holders, said holders being supported upon the base, means for adjusting and securing the said holders in potions towards or from the said passage in the base, each of the said holders having a right angled seat opening outwardly, wedge shaped guide blocks, wedge shaped clamping plates, said blocks and plates being placed together with the plates exteriorly thereby forming a bipartite body substantially rectangular in cross-section and fitting the said seats in the holders, securing means engaging the said blocks, plates and holders, and each of the blocks having a corner portion cut away whereby a vertical saw guiding face is formed and presented directly and near the saw when the parts are assembled.

2. A band saw guide comprising a base member having a longitudinally directed passage for the saw, a top plate bearing on the base and having a longitudinally directed passage coincident with the passage of the base, stop portions rising from the top plate in spaced relation, a plurality of guide block holders disposed side by side upon said top plate between said stop portions, each of said holders being formed with an outwardly opening seat having its bottom inclined downwardly and outwardly and terminating in a lateral stop shoulder, a plurality of guide blocks bearing in the inclined bottom of each seat, each of said blocks formed with its outer face converging toward the lower end and bearing thereby against the stop shoulder and with its inner face perpendicular next to the saw, a plurality of clamp members bearing upon the outer inclined faces of the guide blocks and diverging toward the upper end and bearing by the lower wider end upon the stop shoulder externally of the guide blocks, and fastening means operating to compress the clamp members and guide blocks upon the holders.

3. A band saw guide comprising a base member having a longitudinally directed passage for the saw, a top plate bearing on the base and having a longitudinally directed passage coincident with the passage of the base, stop portions rising from the top plate in spaced relation, a plurality of guide block holders disposed side by side upon said top plate between said top portions, each of said holders being formed with an outwardly opening seat having its bottom inclined downwardly and outwardly and terminating in a lateral stop shoulder, a plurality of guide blocks bearing in the inclined bottom of each seat, each of said blocks formed with its outer face converging toward the lower end and bearing thereby against the stop shoulder and with its inner face perpendicular next to the saw, each of said guide blocks having half sockets in its side edges, a plurality of clamp members bearing upon the outer inclined faces of the guide blocks and diverging toward the upper end and bearing by the lower wider end upon the stop shoulder externally of the guide blocks, and clamp bolts extending through the clamp members and threaded in the holders and engaged by the half sockets of the guide blocks.

4. A band saw guide, comprising a head block having a projecting nose provided with an uppermost horizontal surface and an intersecting lower surface inclined upwardly and forwardly towards the saw passage, an adjustable base having a passage for the saw, guide block holders, said holders being supported upon the base, means for adjusting and securing the said holders in positions towards or from the passage in the base, each of said holders having a right angled seat opening outwardly, wedge shaped guide blocks, wedge shaped clamping plates, said blocks and plates being placed together with the plates exteriorly thereby forming a bipartite body substantially rectangular in cross-section and fitting the said seats in the holders, securing means engaging the said blocks, plates and holders, each of the said blocks having a corner portion cut away to form a vertical saw guiding face, and the said seats in the holders being constructed to hold the said clamping plates with their outermost surfaces at the same angle of inclination as that of the said inclined surface of the head block.

In testimony whereof I affix my signature.

JOSEPH W. CAUSEY.